(12) United States Patent
Pedersen et al.

(10) Patent No.: US 11,466,983 B2
(45) Date of Patent: Oct. 11, 2022

(54) METHOD AND APPARATUS FOR CALCULATION OF WALL THICKNESS VARIATIONS

(71) Applicant: ClampOn AS, Laksevåg (NO)

(72) Inventors: Audun Oppedal Pedersen, Nesttun (NO); Geir Instanes, Nesttun (NO)

(73) Assignee: CLAMPON AS, Laksevåg (NO)

( * ) Notice: Subject to any disclaimer, the term of this patent is extended or adjusted under 35 U.S.C. 154(b) by 0 days.

(21) Appl. No.: 16/842,027

(22) Filed: Apr. 7, 2020

(65) Prior Publication Data
US 2021/0310802 A1 Oct. 7, 2021

(51) Int. Cl.
*G01B 17/02* (2006.01)
(52) U.S. Cl.
CPC .................................. *G01B 17/02* (2013.01)
(58) Field of Classification Search
CPC ... G01N 2291/02584; G01N 2223/633; G01B 17/02
USPC .......................................................... 73/632
See application file for complete search history.

(56) References Cited

U.S. PATENT DOCUMENTS

| 2007/0167786 A1* | 7/2007 | Lee .......................... A61B 8/00 600/447 |
| 2010/0131246 A1 | 5/2010 | Volker et al. |
| 2013/0263667 A1 | 10/2013 | Volker et al. |
| 2014/0208852 A1 | 7/2014 | Instanes et al. |
| 2015/0233710 A1 | 8/2015 | Simonetti et al. |
| 2017/0191966 A1* | 7/2017 | Niri ...................... G01N 29/041 |
| 2017/0191988 A1 | 7/2017 | Niri et al. |

FOREIGN PATENT DOCUMENTS

EP  3 318 869 A1  5/2018

OTHER PUBLICATIONS

United Kingdom Combined Search and Examination Report for Application No. GB2005130.6, dated Jan. 18, 2021.
British Search Report issued in British Patetn Application No. GB2005130.6, dated Jan. 18, 2021.
Norwegian Search Report issued in Norwegian Patent Application No. 20200425, dated Dec. 4, 2020.

* cited by examiner

*Primary Examiner* — Tarun Sinha
(74) *Attorney, Agent, or Firm* — Birch, Stewart, Kolasch & Birch, LLP

(57) ABSTRACT

The disclosure relates to an ultrasound-based method for calculating wall thickness, or a change thereof, in points within a monitored area of a wall, said method being based on measurement results from a process in which acoustic, guided waves are transmitted from transmitting transducers, propagated in the wall, received by receiving transducers and then recorded. Each recorded signal is interpreted as carrying information about the wall thickness, or change thereof since a previous measurement, throughout a measured section comprising a two-dimensional area of the wall. The wall thickness, or change thereof, is at least in part calculated for each segment of the monitored area, wherein a segment is a subset of the monitored area contained in a distinct combination of the measured sections. The disclosure further relates to an apparatus for acoustic, guided-wave measurement or monitoring of wall thickness, or a change thereof.

14 Claims, 3 Drawing Sheets

METHOD AND APPARATUS FOR CALCULATION OF WALL THICKNESS VARIATIONS

TECHNICAL FIELD

The present disclosure relates to a method and apparatus for calculation of wall thickness variations based on mean value measurements, in pipes, plates, and similar structures.

INTRODUCTION

Many approaches have been made to producing two-dimensional maps of wall thickness in a section of straight and bent pipes. The most sophisticated method for such mapping is guided wave travel time tomography as disclosed by G. Instanes, P. Nagy, F. Simonetti and C. Willey, in "Measuring wall thickness loss for a structure". US Patent Application 20140208852, "Methods and apparatus for measurement or monitoring of wall thicknesses in the walls of pipes or similar structures"; US Patent Application 20150233710 and "System and method for performing ultrasonic pipeline wall property measurements"; US Patent Application 20130263667.

An apparatus for measuring or monitoring the thickness of a wall can comprise a control and processing unit 110, a transceiver unit 120 for ultrasound signal generation and acquisition, a plurality of ultrasound transducers 205, and materials for affixing the transducers. The apparatus is shown in FIG. 1.

Ultrasound transducers 205 are placed on an accessible surface 201 of a wall 200. The transducers 205 are preferably grouped in at least two groups, each group comprising a plurality of transducers (205'-205"), wherein the transducers are arranged in a spaced-apart pattern. The process of generating a tomographic wall thickness map comprises measurement phase and data processing phase. Measurements are made in a pitch-catch mode of operation, operating one transducer at a time to transmit an acoustic guided wave signal, let the signal propagate in the pipe wall, and subsequently receive the propagated signal at other transducers. A change in the travel time of the ultrasonic signal between two transducers, since a previous measurement, encodes a change in the mean signal propagation speed. If the mode of signal propagation is a dispersive guided wave, such a change in mean propagation speed can be interpreted as a change in mean wall thickness. The plurality of paths traversed by guided wave signals between transmitting and receiving transducers cover different parts of the wall and form different angles to the pipe axis. In sum, the paths of ultrasound propagation provide measurements across a monitored area of the wall and a variety of viewing angles at each location within the monitored area.

In the data processing phase, this plurality of area coverages and viewing angles due to the plurality of signal propagation paths provides basis for two-dimensional resolution in a wall thickness map generated by tomographic data processing of the measurement results.

Tomographic algorithms for wall thickness mapping according to the present art employ algorithms that account for changing signal propagation paths due to inhomogeneous spatial distribution of the signal propagation speed, such as by solving the eikonal equation. Coordinate transformations and corrections exist to account for factors such as pipe and bend wall curvature and diffraction.

Tomographic wall thickness mapping tends to be complex and computationally expensive. This is rarely a problem when sufficient computing power is available and when the calculations are made automatically as part of a continuous monitoring process. Interactive studies based on large amounts of raw measurement data are however impeded by long calculation times, making it desirable to create at least simple wall thickness maps quickly. In applications with little available computing capacity, such as in subsea instrumentation and in battery operated equipment at remote locations, there is also need for simple algorithms to enable automatic wall thickness mapping.

Methods solving the eikonal equation are based on a ray-theoretical approximation and might in some cases need correction to account for diffraction, as the length of guided wave propagation paths is typically less than 50 wavelengths. Numerous experimental studies have also shown that acoustic guided wave propagation paths are not only sensitive to wall thickness variations along a geometrical ray but have finite areas of sensitivity. Academic studies have explored tomographic wall thickness mapping using full-waveform inversion, see e.g. Rao, Ratassepp, and Fan, J. Sound Vib. 400 (2017). This approach has potential to produce wall thickness maps with good accuracy and resolution, but at increased computational cost.

Objective

One of the objectives of the disclosure is to provide a method and an apparatus for calculation of wall thickness variations throughout a monitored area of a wall, based on measurements of the mean wall thickness within sections such as based on guided wave propagation times between pairs of transmitting and receiving transducers.

The claimed method can be carried out with greatly reduced computational cost for typical, simple, measurement geometries. This enables interactive recalculations by an operator based on raw acoustic measurement data, as well as automatic rendering of wall thickness maps and calculation of the minimum wall thickness by apparatuses with little computing power.

Moreover, the claimed method allows explicit accounting for the finite width and arbitrary wall thickness sensitivity distribution due to guided wave propagation paths, in contrast to the pure ray-theoretical approximations that are predominant in the present art.

DESCRIPTION

It is disclosed a method and an apparatus for calculating two-dimensional maps of the thickness of a monitored area of a wall, such as in a pipe or plate, based on measurements of mean wall thicknesses across a plurality of subsets of said monitored area, hereinafter "measured sections".

In one embodiment, the measured sections are areas for which the change in average wall thickness can be quantified by means of an acoustic guided wave signal propagated in the wall between a transmitting and a receiving transducer. The measured sections can have length equal to the transducer separation distance, between the transmitting and the receiving transducer, and finite width that depends on the transducer separation distance and the acoustic wavelength of the propagating signal. In general, the sensitivity of the propagated signal to wall thickness change at any point in the monitored section is non-uniform. As a crude approximation, it can still be sufficient to model this sensitivity as constant inside a bounding curve such as an ellipsoid, and zero outside it. The width of this bounding curve, or the spatial distribution of the acoustic sensitivity to wall thickness change, is typically determined semi-empirically.

The transmitting and receiving transducers can be arranged to provide a plurality of m partially overlapping measured sections, which in sum cover the monitored area. A segment can be defined as an area that falls inside a specific combination of one or more measured sections. The number n of segments within the monitored area is thus greater than or equal to m. The transmitting and receiving transducers can be further arranged to provide a high number of segments with small areas, so that knowledge of the wall thickness on each segment would constitute a detailed wall thickness map of the monitored wall. The wall thickness for each segment is however not measured directly but shall be calculated from measurement results for the mean wall thickness for each measured section.

The measured sections are identified by an index i. The segments formed by all partially overlapping measured sections throughout the monitored area are identified with an index j. A loading matrix $W=\{w_{i,j}\}$, $i=1, 2, \ldots, m$, $j=1, 2, \ldots, n$, can be defined to represent how much a change in the mean wall thickness $s_j$ on the j'th segment affects the mean wall thickness $p_i$ for the i'th measured section. Every point within a measured section falls within one and only one segment. The sum of loading coefficients $w_{i,j}$ on each area of sensitivity are normalized so that $\Sigma_j w_{i,j}=1$ for all i. In a simplified embodiment, the elements of W are determined by assuming constant sensitivity inside bounding curves for each measured section, as described above. In this case each loading coefficient is simply the fraction of the measured section i that is covered by each segment j.

A set of linear equations relates the average wall thicknesses $t=[t_1, t_2, \ldots, t_m]$ of each measured section to the average wall thicknesses on each segment, $s=[s_1, s_2, \ldots, s_n]$:

$$W \cdot s = t \quad (1)$$

Equation (1) can be solved directly for s, but has infinitely many solutions when the areas of sensitivity partially overlap each other. When substituting measurement results $t_{measured}$ for t, the direct solutions are also unphysical and tend to exaggerate wall thickness changes for segments that coincide with a single or few measured sections, due to the unavoidable measurement error $e=[e_1, e_2, \ldots, e_n]$, $$t_{measured} = t + e \quad (2)$$

These challenges can be overcome in several ways. There are numerous algorithms available for least-squares minimization under constraints. One can also apply a more general inverse-problem solving technique, starting with an initial guess $s_0$ for the vector of segment wall thicknesses. This initial assumption can be results from an earlier point in time, or e.g., all segment thicknesses could be set equal to a nominal value or the mean of the measurement results $t_{measured}$. A series of iterative steps k is carried out, wherein each the current approximate solution $s_k$ is inserted into the forward problem in Equation (1) with $t_{measured}$ substituted for t. A cost function E can be defined as, for example, the modulus of the residual vector, $$E_k = \|W \cdot s_k - t_{measured}\| \quad (3)$$

The residual vector $W \cdot s_k - t_{measured}$ is used to calculate a next approximate solution $s_{k+1}$. Based on a conservative initial guess, the correction in each step can be weighted to avoid over-adjusting the error-prone segments that coincide with only one or a few measured sections. A regularization step can also be inserted after every few iterations to adjust the segment wall thicknesses $s_k$ towards a physically acceptable solution. The regularization step can include various adjustments based on knowledge of the measurement physics and otherwise the measurement problem at hand. Two possible examples are to prohibit local wall thickness growth as acceptable part of the solution and to reduce the wall thickness contrasts between adjacent segments based on knowledge of the spatial resolution of the acoustic waves.

The iterative solution process ends when the cost function reaches a sufficiently small value or when a maximum number of iterations has been carried out. A final regularization step can be performed if necessary, to achieve a physically sound wall thickness map and at the same time approximate the measurement results. An operator of the apparatus may be presented with the final wall thickness map and/or extracted values such as the minimum wall thickness and the location of the minimal point.

DESCRIPTION OF THE DRAWINGS

Embodiments of the disclosure will be described, by way of example only, with reference to the following drawings wherein.

DESCRIPTION OF EMBODIMENTS

Figure 1:
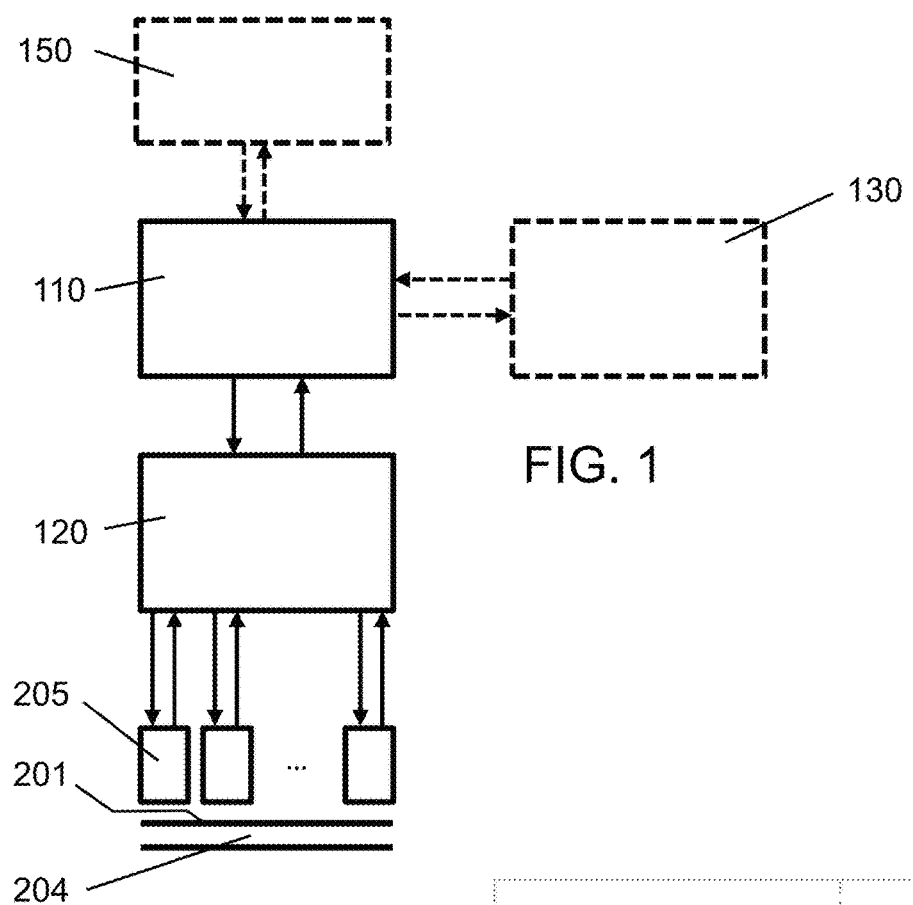
FIG. 1 shows a block diagram of a typical system for wall thickness monitoring by use of acoustic guided waves.

FIG. 1 shows a block diagram of an apparatus for monitoring wall thickness by means of acoustic guided waves. A control and processing unit 110 controls the measurement process, which is performed at predetermined or automatically determined times. Typical intervals between measurements may be minutes, hours, or days, depending on the expected rate of wall thickness loss and the intended application of the measurement results. For example, erosion due to sand and other particles in multiphase petroleum production flow, water cooling systems, or hydropower may in special cases lead to wall loss rates of several millimeters per hour. Internal and external corrosion of pipes and tanks depend on chemical factors, temperature conditions, and flow properties, and may progress over months or years before any corrective action is required. Monitoring of the wall thicknesses may still be of paramount importance because loss of containment of many fluids can be catastrophic.

The measurement results can optionally be made available to an operator via an operator interface 130, by means of which the measurement system can also be configured. The operator interface 130 may be connected directly to the control—and processing unit, integrated therein, or connected via or integrated in a larger control—or computer system 150 on to the plant where the apparatus is installed. Measurement results can optionally be communicated directly to the Control system 150 or another electronic infrastructure.

A transceiver 120 is controlled by the control and processing unit 110 and connected to a plurality of electroacoustic transducers 205. The transducers 205 are positioned on the exterior surface 201 of the wall 204 of a pipe or other structure, and are either permanently fixed, replaceable, or moveable along a trajectory on the wall surface 201. Each transducer 205 may be used for signal transmission from the transceiver 120 into the wall 204, signal reception from the wall to the transceiver, or both.

In one embodiment, the measurement process can be said to comprise following:

1. The transceiver 120 generates an ultrasound signal and transmits it into the wall 204 by means of one transducer 205.
2. The said ultrasound signal propagates within the wall 204 from said transmitting transducer 205 to one or several receiving transducers 205.
3. Upon arrival at each receiving transducer 205, said ultrasound signal is converted to an electrical signal by the receiving transducer 205 and recorded by the transceiver 120.

1-3 are repeated until ultrasound transmission has been carried out between all necessary pairs of transducers 205 for signal transmission and reception on the pipe wall.

4. Thereafter, all the recorded signals are transferred to the control and processing unit 110.
5. The recorded signals are subjected to a numerical procedure for calculating the mean wall thickness, or change thereof since a previous measurement, for the measured sections corresponding to each pair of transmitting and receiving transducers 205.
6. The mean wall thicknesses obtained for each measured section are then submitted to the method described above for generating a map of wall thicknesses throughout the monitored wall area. Depending on the application, the minimum wall thickness can then be identified and the location of minimum thickness on the wall can be identified.
7. The recorded signals and calculation results can be stored within the control and processing unit. The results of the measurement process can be transferred to the control system.

This procedure has a low computational cost when the number of transducers and measured sections is relatively low, as is typical throughout a wide range of applications of guided-wave wall thickness monitoring systems. Interactive recalculation based on raw acoustic measurement data is typically achieved within few minutes using a normal personal computer. Automatic generation of wall thickness maps, e.g., to calculate the minimum wall thickness and identify its position, can be done even by a microcontroller, within a time comparable to the time needed to carry out a full set of acoustic measurements.

Figure 2:
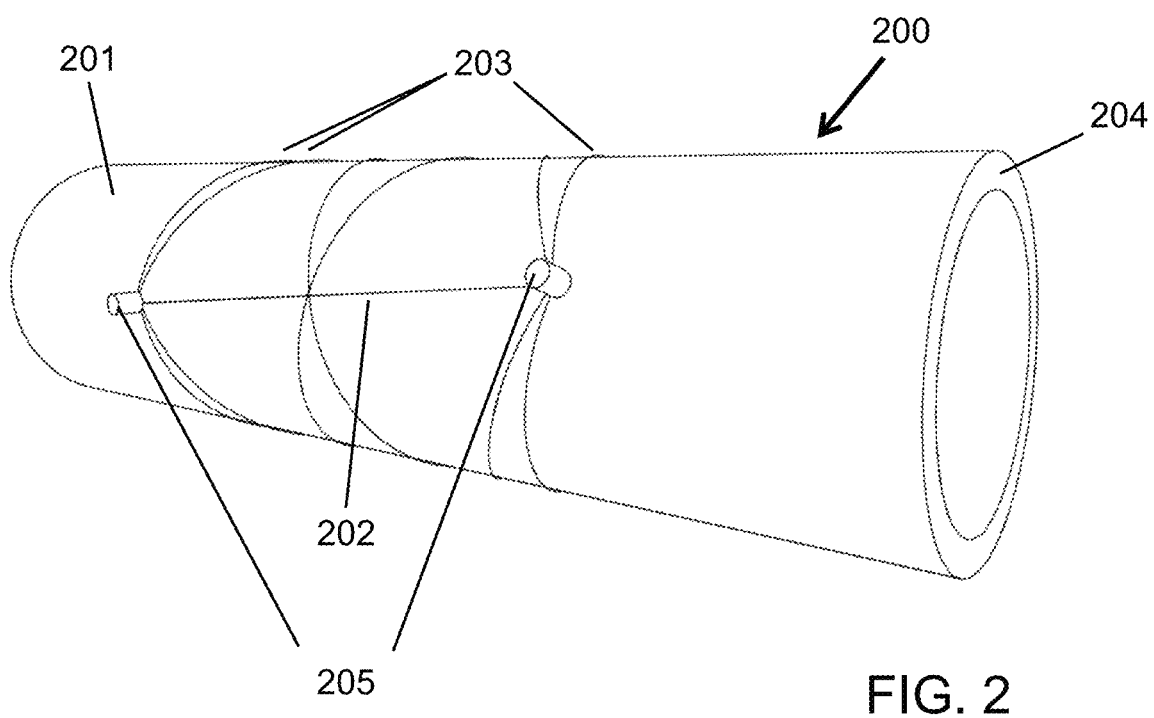
FIG. 2 shows direct and helical paths of guided wave propagation in a pipe wall between pairs of transmitting and receiving transducers.

Reference is now made to FIG. 2 illustrating direct and helical propagation paths of acoustic guided waves in a wall 204 of a pipe 200. A direct propagation path 202 is the shortest between a pair of transmitting and receiving transducers 205. In addition, there may exist an infinite number of helical signal propagation paths 203 that go around the circumference of the pipe before reaching a receiving transducer. The use of helical signal propagation paths adds measurement data and also axial resolution for generation of two-dimensional maps of wall thickness and changes thereof.

The wall may also belong to a vessel containing oil, gas, or a multiphase production fluid or a chemical process fluid. Alternatively, the wall may belong to a vessel containing water produced in connection with oil and gas production or cooling water.

Figure 3:
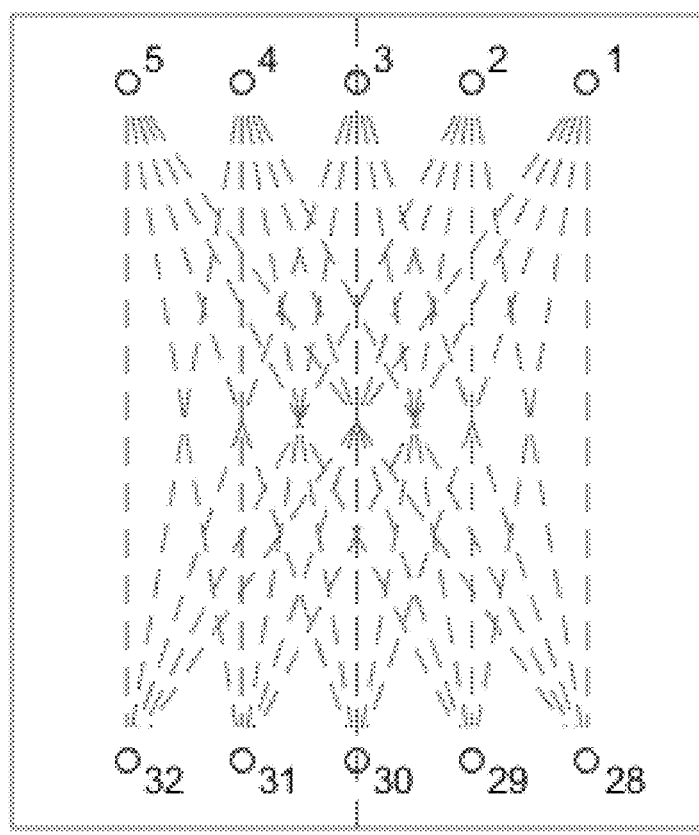
FIG. 3 shows a two-dimensional representation of guided wave propagation paths between pairs of transmitting and receiving transducers.

FIG. 3 illustrates positions of transmitting and receiving ultrasound transducers placed on two sides of a monitored area. The direct propagation paths are indicated with dashed lines. For pipes the transducers may be distributed in rings around the full pipe circumference so that signal paths such as between the transducers numbered 1 and 32 would be equally short as between the transducers numbered 1 and 29 in the illustration. This consideration is not reflected in FIG. 3.

Figure 4:
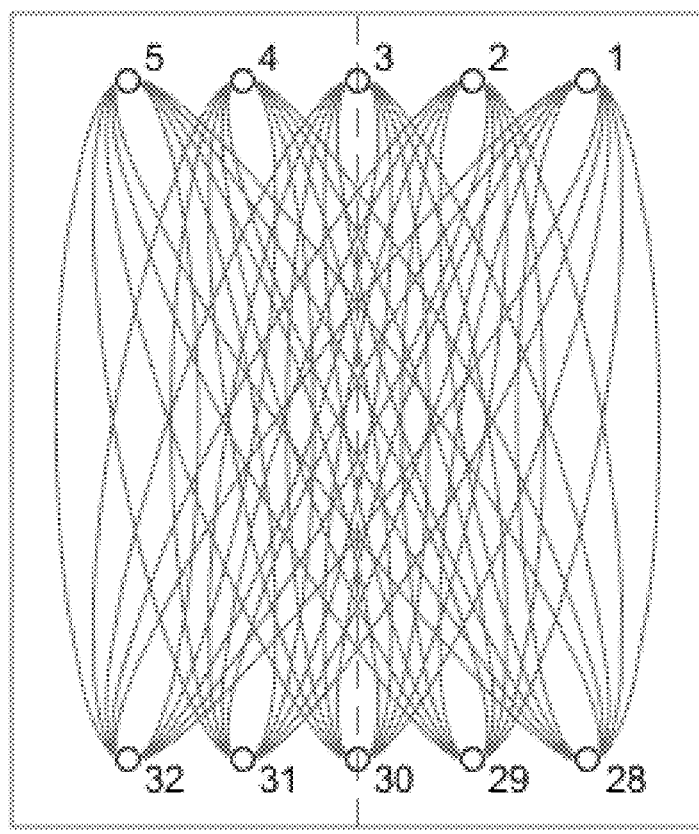
FIG. 4 shows bounding curves for measured sections due to the guided wave propagation paths indicated in FIG. 3.

FIG. 4 shows, in an exemplary embodiment, elliptical bounding curves of measured sections due to each direct propagation path indicated in FIG. 3. The bounding curves delimit a great number of small segments throughout the monitored area, each segment defining a wall area covered by a specific combination of measured sections. Segments may be contiguous or non-contiguous, the latter meaning that a particular combination of measured sections covers more than one contiguous area.

Figure 5:
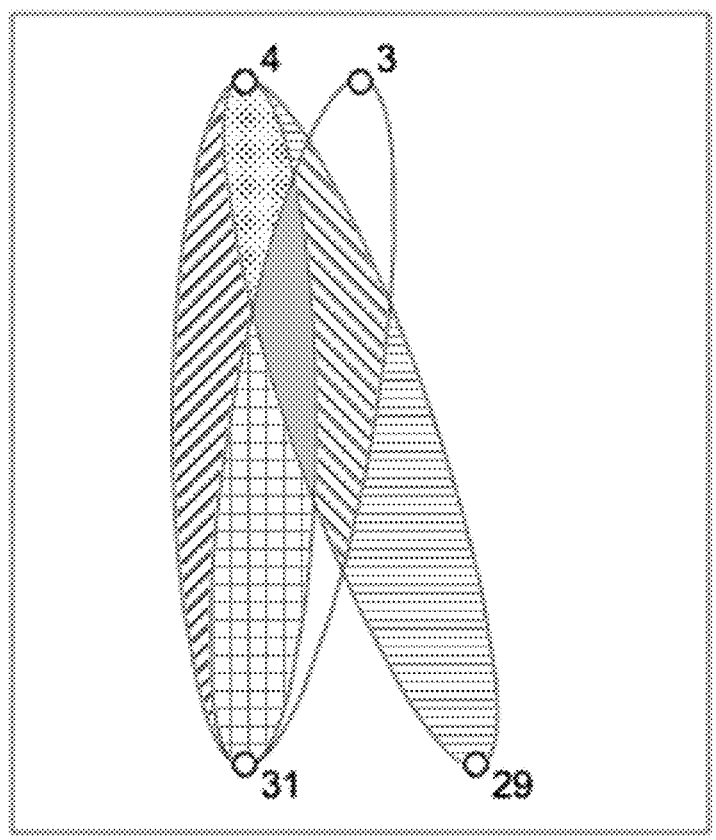
FIG. 5 illustrates as an example the segments due to three partially overlapping measured sections.

FIG. 5 illustrates further, as an example, elliptical bounding curves of three measured sections and the 7 segments they delimit. Segment G is an example of a non-contiguous segment, covered only by the measured section due to the transducers numbered 3 and 31. Different embodiments may process non-contiguous segments as a single segment or as multiple distinct segments, or as single or multiple segments in the various steps of the data processing procedure.

Figure 6:
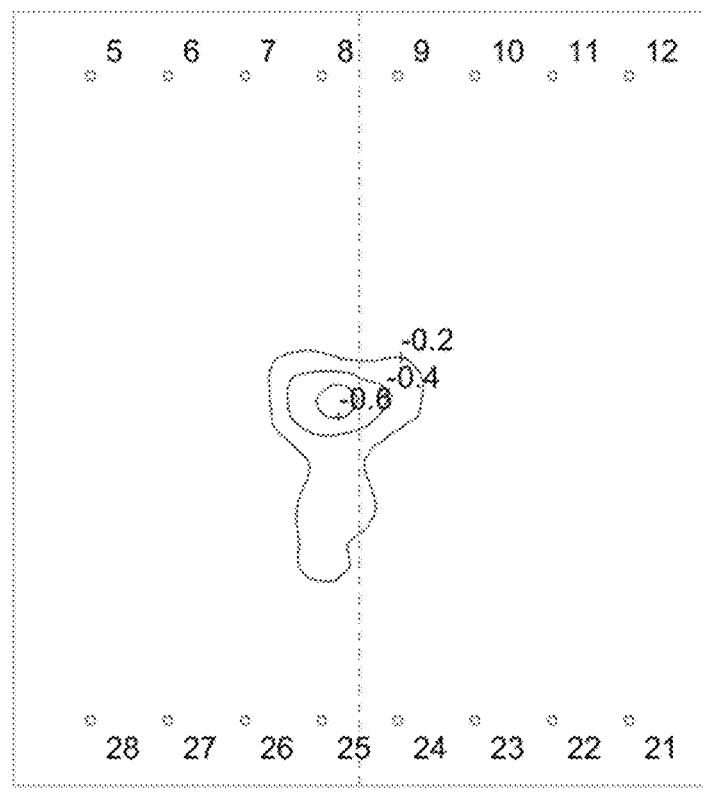
FIG. 6 shows a contour map of wall thickness losses generated by use of one embodiment.

FIG. 6 shows a map of wall thickness change. Transducers were placed in two rings around the circumference of a pipe with 8-inch nominal pipe size and 8 millimeter wall thickness. An initial set of guided wave measurements was recorded before a portion of the pipe wall, positioned between the two rings of transducers, was abraded to reduce the wall thickness. A new set of guided wave measurements was then recorded and processed together with the initial measurement data. The map of wall thickness change is shown as a contour plot of wall thickness changes in units of millimeters.

The invention claimed is:

1. An ultrasound-based method for calculating wall thickness or a change thereof in points within a monitored area of a wall, said method being based on measurement results from a process in which acoustic guided waves are transmitted from a plurality of transmitting transducers, propagated in the wall, received by a plurality of receiving transducers and then recorded, wherein each recorded signal is interpreted as carrying information about the wall thickness, or change thereof since a previous measurement, throughout a measured section comprising a two-dimensional area of the wall and wherein the wall thickness, or change thereof, is at least in part calculated for each segment of the monitored area, between a transmitting transducer and a receiving transducer, wherein a closed bounding curve is defined for each measured section such that the closed bounding curves extend transversely from the transmitting transducers to the receiving transducers, wherein the bounding curves intersect, the intersecting bounding curves defining a number of segments within the monitored area such that a segment is a subset of the monitored area which is contained in a distinct combination of the measured sections, wherein the sensitivity of a recorded measurement to wall thickness, or change thereof, occurring in any point within the measured section, is assumed to depend upon the position of said point, and a recorded signal corresponding to the measured section is taken to be insensitive to wall thicknesses outside the bounding curve, and wherein the recorded signal corresponding to a monitored section is taken to encode the arithmetic mean wall thickness, or change thereof, within said monitored section, wherein the wall thickness, or change thereof, is, at least in part, calculated for each segment of the monitored area.

2. The method according to claim 1, wherein the recorded signal corresponding to each measured section is taken to be equally sensitive to the wall thickness, or change thereof, occurring in any point inside the bounding curve.

3. The method according to claim 1, wherein a segment is said to be contained in a measured section if it is inside the bounding curve corresponding to that said measured section.

4. The method according to claim 3, wherein the bounding curve is the first Fresnel zone.

5. The method according to claim 4, wherein the length and the width of the bounding curve are adjusted on theoretical or empirical basis to account for factors including wall surface topology, curvature of the wall and size and geometry of the transducers.

6. An ultrasound-based apparatus for acoustic, guided-wave measurement or monitoring of wall thickness, or a change thereof, said apparatus comprising a plurality of transducers, a transceiver and a control and processing unit in which the transceiver may be incorporated, with the transducers configured in at least two groups, each group comprising a plurality of transducers arranged in a spaced-apart pattern on the surface of the wall, and where ultrasound signals are transmitted as guided waves from a plurality of transmitting transducers, propagated in the wall, received by a plurality of receiving transducers, recorded by the transceiver and processed by the control and processing unit to calculate the wall thickness, or change thereof, in points within a monitored area of the wall, wherein each recorded signal is interpreted as carrying information about the wall thickness, or change thereof since a previous measurement, throughout a measured section comprising a two-dimensional area of the wall between a transmitting transducer and a receiving transducer, wherein a closed bounding curve is defined for each measured section such that the closed bounding curves extend transversely from the transmitting transducers to the receiving transducers, wherein the bounding curves intersect, the intersecting bounding curves defining a number of segments within the monitored area such that a segment is a subset of the monitored area which is contained in a distinct combination of the measured sections, wherein the sensitivity of a recorded measurement to wall thickness, or change thereof, occurring in any point within the measured section, is assumed to depend upon the position of the said point, and a recorded signal corresponding to the measured section is taken to be insensitive to wall thicknesses outside the bounding curve, wherein the recorded signal corresponding to a monitored section is taken to encode the arithmetic mean wall thickness, or change thereof, within said monitored section, and where the wall thickness, or change thereof, is, at least in part, calculated for each segment of the monitored area.

7. The apparatus according to claim 6, wherein the recorded signal corresponding to each measured section is taken to be equally sensitive to the wall thickness, or change thereof, occurring in any point inside the bounding curve.

8. The apparatus according to claim 6, wherein a segment is said to be contained in a measured section if it is inside the bounding curve corresponding to said measured section.

9. The apparatus according to claim 8, wherein the bounding curve is the first Fresnel zone.

10. The apparatus according to claim 9, wherein the length and the width of the bounding curve are adjusted on theoretical or empirical basis to account for factors including wall surface topology, curvature of the wall and size and geometry of the transducers.

11. The apparatus according to claim 10, wherein the wall is that of a straight or bent pipe, and the transducers belonging to the at least one of the groups comprising transducers are circumferentially distributed around the pipe.

12. The apparatus according to claim 10, wherein the transducers belonging to the at least one of the groups comprising transducers are arranged in straight lines or curves.

13. The apparatus according to claim 12, wherein all the transducers can be operated both to transmit and to receive acoustic guided waves.

14. The apparatus according to claim 12, wherein the transducers belonging to a first group of transducers are operated only to transmit acoustic guided waves while the transducers belonging to a second group of transducers are operated only to receive acoustic guided waves.

* * * * *